Sept. 26, 1950 E. E. WILLIAMSON 2,523,407

PERMEABILITY TUNING CONTROL

Filed March 22, 1945 2 Sheets-Sheet 1

INVENTOR.
Edward E. Williamson
BY J. D. Douglas
ATTORNEY

PERMEABILITY TUNING CONTROL

Filed March 22, 1945 2 Sheets-Sheet 2

INVENTOR.
Edward E. Williamson
BY
J. D. Douglas
ATTORNEY.

Patented Sept. 26, 1950 2,523,407

UNITED STATES PATENT OFFICE 2,523,407

PERMEABILITY TUNING CONTROL

Edward E. Williamson, Chicago, Ill., assignor to Admiral Corporation, Chicago, Ill., a corporation of Delaware Application March 22, 1945, Serial No. 584,182

5 Claims. (Cl. 74—10.7)

This invention relates to improvement in controls whereby a rotary movement may be converted into a linear movement and the ratio of said movements is in a reduced proportion. More particularly it relates to an improved control useful for tuning radio receivers or the like.

Modern radio receivers are usually constructed with tunable circuits which are tuned to select a certain desired frequency. These circuits may be tuned by varying the capacity or the inductance of the circuit. When the capacity is varied, it may be by the use of a variable condenser. When the inductance is varied it may be by moving a core composed of powdered iron, called a slug, into and out of the field of the coil. The most common type of permeability tuning comprises sliding a slug into and out of the form which supports the coil.

Previous tuning controls have been provided in various forms. In most events these have contemplated complicated systems of gears and levers. Further in the prior systems it was difficult and relatively expensive to provide a suitable tuning indicateor so coupled to the slugs as to indicate the exact tuning thereof.

The present invention contemplates means for converting a rotary movement to a straight line or linear movement and utilizing this movement to move the slug or slugs for tuning the circuit. Although the invention about to be described is particularly useful in permeability tuning, it will also be apparent that it adapts itself readily for controlling condensers of the cylindrical type, where one cylinder is telescoped over the other, and is therefore not limited to slug tuning.

I am able to provide a considerable reduction in the speed of the slug drive, in a manner cheap and positive in operation and simple in construction. The tuning indicator can be arranged to move a considerably greater distance than the movement of the slug. The ratio can be 2:1, 4:1 or a larger ratio if desired.

Other features of the invention, and the invention itself, will become more apparent from the following description of an embodiment thereof, which description is illustrated by the accompanying drawings and forms a part of this specification.

Figure 1:
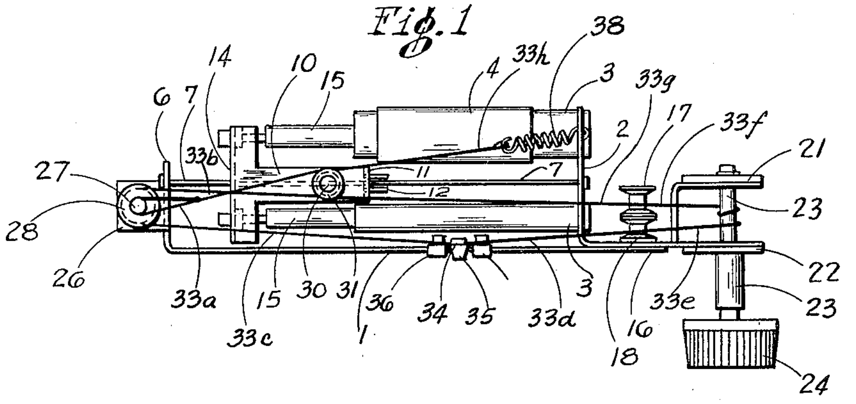
Fig. 1 is a plan view of a receiver control illustrating my invention.

In carrying out my invention I preferably provide a support for the coils or inductance elements, and a support for a carriage or slide which in turn carries the permeability tuning cores or slugs. The carriage is movable in parallel relation to the axis of the coil or coils and when moved the slug is projected into or withdrawn from the coil or coils.

Means is provided for moving the carriage which includes a flexible cable or cord formed to provide a pair of loops. One end of each loop is secured in an immovable manner to a fixed support, which may be the frame. The bights of the loop are trained about sheaves carried on a post on the carriage. The ends of the cords are trained about fixedly supported sheaves, carried by the frame adjacent to or at the place where the first mentioned loop ends are secured, and then connected to each other. Means is provided to move the cord bodily between the fixed sheaves to cause one of the loops to become smaller and the other larger or vice versa. If one loop becomes smaller and the other larger, then the bights simultaneously change their position relative to the fixed support moving the carriage therewith.

During this movement a fixed point on the run of the cord between the fixed sheaves will move twice as far as the bights. Therefore an indicator pointer may be secured at some point on this run which enables the frequency indicia to be spread out over a greater portion of a dial providing a band spread effect for tuning.

In the drawings and description I have shown and described, in order to furnish a better understanding of my invention, a simplified form thereof. It will be apparent, however, that by certain modifications greater ratios of movement may be attained, and that therefore the invention is not limited to the specific form shown as will hereinafter be more clearly pointed out.

Figures 2, 3:
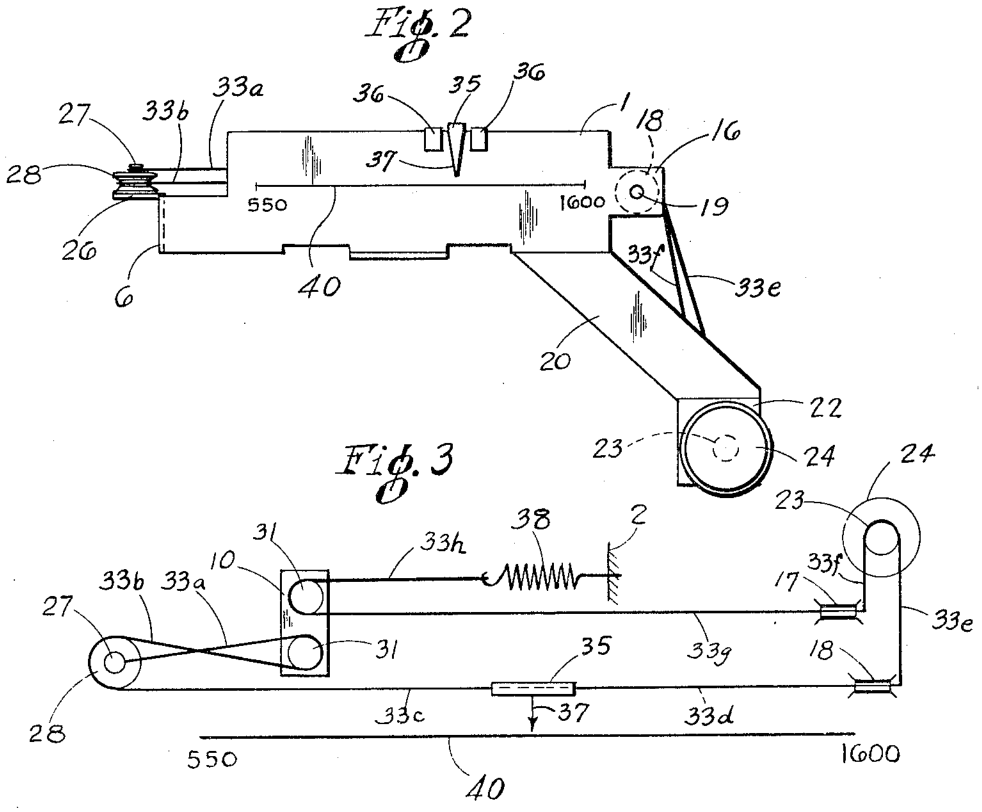
Fig. 2 is a front elevational view thereof.
Fig. 3 is a diagrammatic view of the device of Figs. 1 and 2, wherein one of the sheaves is shown in two parts in order to depict the invention more clearly.

Referring now to the drawings, throughout which like parts are designated by like reference characters, and more particularly to Figs. 1 and 2, the tuner assembly illustrated is exemplary of one manner in which the invention may be employed. It will be apparent that the particular showing by no means illustrates the only manner of arrangement of parts. In this case the associated receiver components have been omitted in the interest of clarity. A frame is provided which includes a plate 1 having a bracket 2 extending rearward therefrom (Fig. 1) and which supports, in a horizontal position, a pair of coil forms 3. The coil forms may carry thereon a winding, indicated as 4, in a manner well known to those versed in the art. The plate is provided in a second bracket 6 on the left end as viewed in the figures, which also extend rearwardly and parallel to the bracket 2. Supported between these two brackets, 2 and 6, is a rod 7. The rod may extend through the brackets and be secured by a nut, or it may be staked into the bracket or held therein in any desired manner. Slidably supported on the rod 7, is carriage or slide which serves as a slug carrier and which comprises a flat metal body 10 of general T-shaped form, having the end bent downward at 11 then outward at 12 to provide a U-shaped guide. The rod 7 extends between the walls of the guide 12 and through an opening in the wall 11. The other end or head of the T is bent downward at 14 to provide a downwardly extending flange. The rod 7 also extends through an opening in this flange, and the carrier is thus slidably supported on the rod 7.

The flange 14 also supports the slugs 15 which extend into and are slidable into the coil forms 3. When the carrier is slid on the rods 7 the slugs are moved into and out of the coil forms to effect the tuning of a circuit or circuits which may include the coils on the form.

At the other end of the plate there is formed an extension 16 in which is secured a shaft 19 on which is rotatably journalled a pair of sheaves 17—18. An arm 20 depends from the plate 1 and carries on its end a bracket 21 of L shape which extends in spaced parallel relation to the front end 22 of the arm extremity. A shaft 23 is rotatably journalled in the parts 21—22 and is provided with a knob 24 which serves as a means for operating the device as will hereinafter more clearly appear. The slide or carriage 10 for the slugs is moved by a cable which is connected to the carrier. The cable is formed into two loops that are arranged so that when one loop is increased in size the other is decreased in size and vice versa, thus the carriage may be pulled along the rod 7.

The bracket 6 is provided with a horizontal extension 26, which carries a vertical stub shaft 27 on which a sheave 28 is rotatably journalled. The carriage 10 also carries a vertical stub shaft 30 on which a sheave 31 is journalled.

The cable 33 is secured to the stub shaft 27 in any suitable manner such as by the loop 33*a* or it may be secured to the frame. It then passes from the shaft 27 over to and around the sheave 31 in a clockwise direction. Next it extends back as indicated at 33*b* and around the sheave 28 in a counter clockwise direction. It then extends to the right at 33*c*, being attached at 34 to the dial indicator slide 35. The dial indicator slide comprises a flat metal body with a pair of inverted U-shaped portions 36 shaped to engage with the upper and opposite sides of the frame 1, and carries a pointer 37. The cable then passes from the dial slide at 33*d* over the sheave 18, downward at 33*e* and is wrapped clockwise around the shaft 23. It then extends up at 33*f* over the sheave 17, back at 33*g* and around the sheave 31 in a counter clockwise direction. From the sheave 31 it extends to the right at 33*h* and the end is secured by a spring 38 to the bracket 2.

The spring 38 merely assures that the cord will always remain taut. It will be noted that the cord thus provides 2 loops 33*a*—33*b* and 33*g*—33*h*, the bights of which pass around the sheave 31. It will also be apparent that if one of these loops is enlarged and the other shortened that the sheave 31 will have to move bodily, together with the carriage, to the right or left. This is effected by moving the run of the cable beyond the loops comprising the parts 33*c*, 33*d*, 33*e* and 33*f*, in one direction or the other. The cable is wrapped, for two or three turns, around the shaft 23 and when the shaft is rotated clockwise the part 33*g* of the cord will unwind from the shaft while the part 33*d* will wind up on the shaft, thus pulling on one part of the cord and loosening the other part of the cord. This will cause the loop 33*h*—33*g* to become larger and the loop 33*a*—33*b* to become smaller and will pull the carriage, the loop 33*a*—33*b* becoming smaller, through the sheave 31 and shaft 30, to the left.

This can most clearly be seen from the diagram in Fig. 3. In this case the sheave 31 is depicted as being in two parts. The sheave 31 could be two separate sheaves if desired, in which event it would not be necessary to cross the parts 33*a*—33*b* of the cord.

It will also appear more clearly from Fig. 3 that the carriage or slide is moved by the loops, which comprises the cord doubled back upon itself, that all the parts of the cord except 33*h* and 33*a* move and at twice the rate of the carriage. That is in the embodiment shown, two inches of movement of 33*g* will afford 1 inch of movement of the carriage or a ratio of 2:1.

Figure 4:
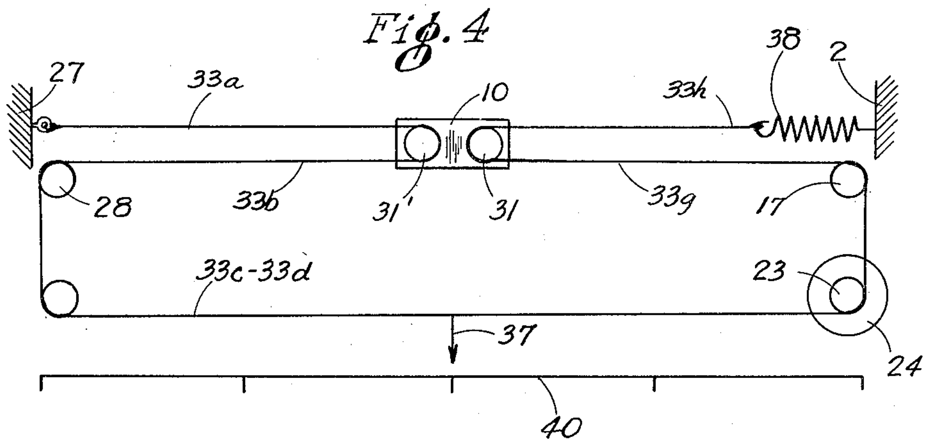
Fig. 4 is a simplified diagrammatic view thereon.

Fig. 4 is a simplified view showing diagrammatically the manner of operation of the device. In this case the carriage 10 is provided with two sheaves 31—31′, it being depicted in this manner for the purpose of simplicity in explanation. It will be understood that one sheave can be used provided the cable of one loop is trained around the sheave clockwise and the other is trained around the sheave counterclockwise. 2 and 27 represent the places on the frame where the ends of the cable are secured, the spring 38 merely serving to keep the cable taut. The left hand loop 33*a*—33*b* is disposed with the bight around sheave 31′. The right hand loop 33*h*—33*g* is disposed with bight around sheave 31. 33*c*—33*d* represents the movable run of the cable, and 37 the indicator pointer which points to the station identification means 40.

If one half inch of cable was taken out of each of the parts 33*h* and 33*g*, the bight of the loop about sheave 31 would move one half inch to the right. If this total of 1 inch was placed in the run 33*c*—33*d* to the right of the indicator 37 it would allow the indicator to move to the left 1 inch. This is in effect what happens when the shaft 23 is rotated. The loop 33*h*—33*g* is shortened and the loop 33*a*—33*b* is lengthened; if one loop is shortened one half inch and the other loop lengthened one half inch, in the process of shortening one and lengthening the other, the indicator 37 which is carried with the cable will move to the left one inch for each one half inch of movement of the carriage 10 to the right. There is thus provided, a change of movement from rotary to rectilinear; a reduction in drive; and a high proportion of movement of the indicator relative to that of the slug carrying carriage 10.

It will also be apparent the certain modifications of the fundamental structure can be made and still remain within the purview of my invention. For instance, it may be desirable to increase the ratio of movement between the slug carriage and the indicator.

A structure which would effect this would be useful for several reasons. It may be desirable to move the slug more slowly, particularly on the high frequency bands, and this may be accomplished without reducing the diameter of the shaft 23. That is if the shaft 23 is larger in diameter it enables it to retain a more efficient frictional engagement with the cable. Furthermore, it may be desirable to have the tuning indicator travel a greater distance thus making permissible a larger dial with the station indicia spread out on this dial. This permits more accurate tuning and logging of the stations.

Figure 5:
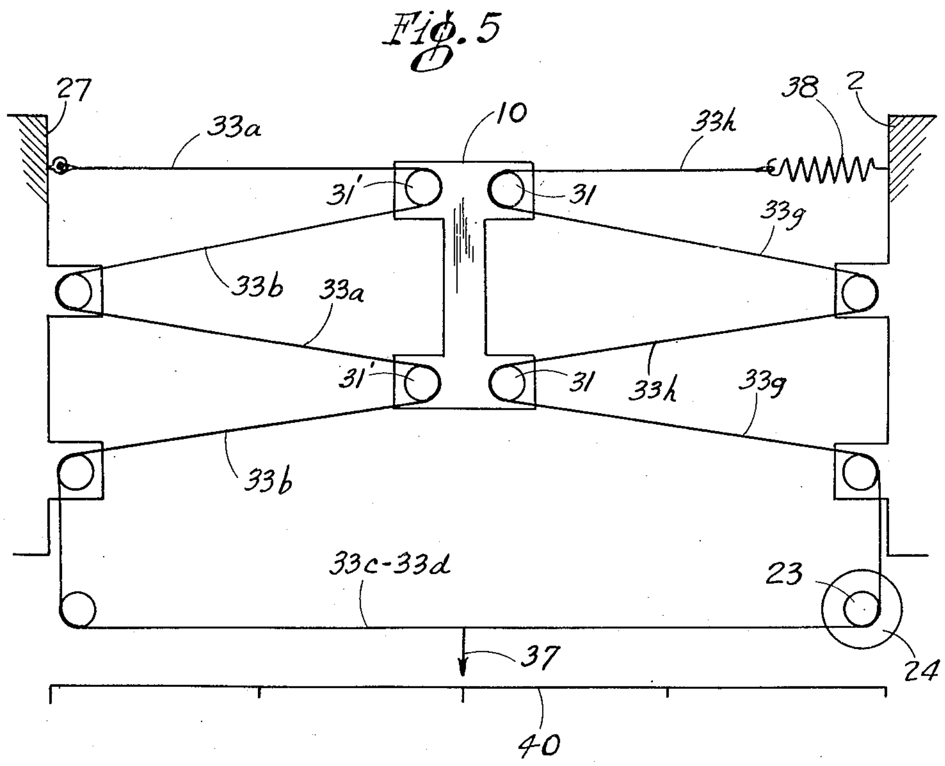
Fig. 5 is a diagrammatic view of a modified form of the invention.

The foregoing may be effected simply by increasing the number of loops which are connected to the carriage. Fig. 5 is an example of how this may be accomplished. In this case, the carriage is provided with two sets of sheaves 31 and 31' as indicated, and the cable is formed to provide two sets of loops 33*a*—33*b* and 33*h*—33*g*. It will appear that if one half inch is taken from each run of the two loops 33*h*—33*g* that this provides two inches of movement for the run 33*c*—33*d*, and a ratio of 4 to 1 between the indicator and the carriage.

In a like manner the loops could be increased in number and as the number of loops is increased the ratio of movement between the indicator and the slide would increase. Two loops would produce a ratio of two to one; four loops, four to one; six loops, six to one, etc.

It will also be apparent that the closer together the ends of the cable opposite the bights of the looped members are kept, the greater the ease of operation, although they may be spread out if desired and still be efficient in operation. The run of the cable beyond the loops may be conducted to substantially any place desired by the proper positioning of sheaves, and the invention therefore lends itself to various designs where the dial may be placed in other places and positions than that shown. The same is true of the position of the control knob since it does not have to be in the same plane with the rest of apparatus, but can be at right angles thereto. The only positive requirement as to the placement of the shaft 23 being that it cannot be in the run 33*h* or 33*a*; preferably it should be somewhere in the run beyond the loops.

It will also be apparent, particularly with reference to Fig. 1 that the forces acting upon the slidable member 10 are in balanced opposition. Because of this, there is no tendency for the slide to be tilted one way or the other thus causing the other parts of the tuner to bind. In the case of Figs. 4 and 5, not only is there a lack of a tilting force, but the effect of the force exhibited by the loops is such as to maintain the carriage with the slugs in alignment with the forms. It appears, therefore, that there may be cases where the only support needed for the carriage 10 is the cable, and that no guiding means such as the rod 7 illustrated in Figs. 1 and 2 will be needed. This illustrates more clearly how the device is self aligning.

Having thus described my invention, I am aware that numerous and extensive departures may be made therefrom without departing from the spirit or scope of my invention.

I claim:

1. A control for a radio receiver or the like including a movable member, support means for movably supporting said movable member comprising a cable having its ends fixedly secured to said support, a connector disposed on said movable member and said cable extending in opposite directions from said points of connection and looped around said connector, a pair of sheaves disposed spaced from said connector and in the general direction of said points of connection and said cable being trained over said sheaves and means connected to said cable intermediate said sheaves to move the cable and slide said movable member.

2. A tuning control for a permeability tuning system having movable slugs for tuning a tuneable circuit comprising a frame, a support carried by the frame, a slidable member slidably journalled on said support and at least one tuning slug carried thereby, means for moving said slide on said frame comprising a cable having its ends secured to the frame at spaced points from each other and in the direction of the movement of the slide, a post carried by the slide, said cable extending from each point of connection to and around said post on said slide, a pair of sheaves disposed on said frame in the same general direction as said points of connection for said cable and said cable extending from said post in opposite directions and around said sheaves, and turnable means supported by the frame and said cable being trained around said turnable means and movable thereby.

3. A tuning control for a permeability tuning system having movable slugs for tuning a tuneable circuit comprising a frame, a support carried by the frame, a slide member slidably journalled on said support and at least one tuning slug carried thereby, means for moving said slide on said frame comprising a cable having its ends secured to the frame at spaced points from each other and in the direction of the movement of the slide, a post carried by the slide, said cable extending from each point of connection to and around said post on said slide, a pair of sheaves disposed on said frame in the same general direction as said points of connection for said cable and said cable extending from said post in opposite directions and around said sheaves, and turnable means supported by the frame and said cable being trained around said turnable means and movable thereby and said cable between each point of fixed connection and its connection to said post and said sheaves comprising at least two loops and said turnable means adapted to decrease the size of one loop and increase the size of the other to move said slidable member.

4. A tuning control for a permeability tuning system having movable slugs for tuning a tuneable circuit, comprising a frame, a support carried by the frame, a slide member slidably journalled on said support and at least one tuning slug carried thereby, means for moving said slide on said frame comprising a cable having its ends secured to the frame at spaced points from each other and in the direction of the movement of the slide, a post carried by the slide, said cable extending from each point of connection to and around said post on said slide, a pair of sheaves disposed on said frame in the same general direction as said points of connection for said cable and said cable extending from said post in opposite directions and around said sheaves, and turnable means supported by the frame and said cable being trained around said turnable means and movable thereby, said cable between each point of fixed connection and its connection to said post and said sheaves comprising at least two loops and said turnable means adapted to decrease the size of one loop and increase the size of the other to move said slidable member and an indicator connected to said cable and movable thereby to indicate the relative position of said tuning slug.

5. A tuning control for a permeability tuning system having movable slugs for tuning a tunable circuit, said control comprising a frame including an arm, a slidable member slidably journaled on said frame and adapted to carry at least one tuning slug, means for moving said slidable member comprising a cable having its ends secured to the frame at points spaced from each other beyond the limits of movement of said slidable member, means on said slidable member adapted to receive a loop of said cable, means carried by said frame and said arm also adapted to receive loops of said cable, said cable forming reversely extending loops about said means on said slidable member and said means on said frame and arm, the means on said arm being mounted for turnable movement and adapted to move said cable to increase and decrease the size of said loops.

EDWARD E. WILLIAMSON.

REFERENCES CITED

The following references are of record in the file of this patent:

UNITED STATES PATENTS

| Number | Name | Date |
|---|---|---|
| 497,706 | Chase et al. | May 16, 1893 |
| 2,224,193 | Mahnken | Dec. 10, 1940 |
| 2,226,822 | Kirk et al. | Dec. 31, 1940 |
| 2,260,985 | Benton et al. | Oct. 28, 1941 |

FOREIGN PATENTS

| Number | Country | Date |
|---|---|---|
| 2,448 | Great Britain | 1880 |
| 385,404 | Great Britain | Dec. 29, 1932 |